(12) United States Patent
Miyashita et al.

(10) Patent No.: US 11,325,528 B2
(45) Date of Patent: May 10, 2022

(54) REAR TURN LAMP

(71) Applicant: KOITO MANUFACTURING CO., LTD., Tokyo (JP)

(72) Inventors: Yuichi Miyashita, Shizuoka (JP);
Masashi Yamazaki, Shizuoka (JP);
Toshikazu Tomono, Shizuoka (JP);
Shinji Ohta, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/077,478

(22) Filed: Oct. 22, 2020

(65) Prior Publication Data

US 2021/0039550 A1 Feb. 11, 2021

Related U.S. Application Data

(63) Continuation of application No. PCT/JP2019/017152, filed on Apr. 23, 2019.

(30) Foreign Application Priority Data

Apr. 25, 2018 (JP) .............................. JP2018-084392

(51) Int. Cl.
*B60Q 1/30* (2006.01)
*B60Q 1/34* (2006.01)
(Continued)

(52) U.S. Cl.
CPC .................. *B60Q 1/30* (2013.01); *B60Q 1/34* (2013.01); *B60Q 1/346* (2013.01); *B60Q 1/2607* (2013.01); *B60Q 1/385* (2013.01)

(58) Field of Classification Search
CPC . B06Q 1/30; B06Q 1/34; B06Q 1/346; B06Q 1/2607; B06Q 1/385
See application file for complete search history.

(56) References Cited

U.S. PATENT DOCUMENTS

2014/0328071 A1* 11/2014 Son ....................... F21S 41/285
362/464
2017/0359869 A1 12/2017 Ohta et al.
(Continued)

FOREIGN PATENT DOCUMENTS

DE 102015201739 A1 8/2015
EP 3272585 A1 1/2018
(Continued)

OTHER PUBLICATIONS

Extended European Search Report dated Apr. 30, 2021, issued by the European Patent Office in corresponding European Application No. 19793718.8. (7 pages).
(Continued)

*Primary Examiner* — Anabel Ton
(74) *Attorney, Agent, or Firm* — Buchanan Ingersoll & Rooney PC

(57) ABSTRACT

A rear turn lamp has a structure formed of divided components, i.e., a first lamp unit provided to a fixed portion of a vehicle body and a second lamp unit provided to a movable portion of the vehicle body. The first lamp unit is provided with a controller. A first lighting circuit turns on multiple first light sources. A second lighting circuit turns on multiple second light sources.

8 Claims, 5 Drawing Sheets

(51) Int. Cl.
   *B60Q 1/26*   (2006.01)
   *B60Q 1/38*   (2006.01)

(56) References Cited

U.S. PATENT DOCUMENTS

2018/0007756 A1   1/2018   Hong et al.
2018/0054862 A1   2/2018   Takagimoto et al.

FOREIGN PATENT DOCUMENTS

JP   2015-145224 A   8/2015
JP   2016-175582 A   10/2016
WO   2016/104282 A1   6/2016

OTHER PUBLICATIONS

International Preliminary Report on Patentability (Form PCT/IB/373) and the Written Opinion of the International Searching Authority (Form PCT/ISA/237) dated Oct. 27, 2020, in the corresponding International Application No. PCT/JP2019/017152. (14 pages).
International Search Report (Form PCT/ISA/210) dated Jul. 2, 2019, in International Application No. PCT/JP2019/017152. (3 pages).

* cited by examiner

REAR TURN LAMP

BACKGROUND

1. Technical Field

The present disclosure relates to an automotive lamp.

2. Description of the Related Art

As an automotive lamp (combination lamp, or simply referred to as a "rear lamp") provided to a rear portion of an automobile, an automotive lamp is known configured such that it is mounted so as to straddle a vehicle main body side and a movable portion such as a trunk lid, rear hatch, or the like. Such a rear lamp is configured as a combination of a movable portion side housing and a vehicle main body side housing configured as divided portions.

Such a rear lamp is provided with a turn lamp (turn signal lamp). In recent years, in some cases, there is a trend of vehicles mounting a turn lamp (which will be referred to as a "sequential turn lamp" hereafter) configured of multiple light sources sequentially turned on so as to form illumination that flows in the traveling direction.

The present disclosure has been made in view of such a situation.

An embodiment of the present disclosure relates to a rear turn lamp formed of a divided component provided to a fixed portion of a vehicle body and a divided component provided to a movable portion of the vehicle body. That is to say, the rear turn lamp has a divided structure including a first lamp unit provided to the fixed portion and a second lamp unit provided to the movable portion. The first lamp unit includes: a controller; one or multiple first light sources; and a first lighting circuit structured to turn on the one or multiple first light sources. The second lamp unit includes: multiple second light sources; and a second lighting circuit structured to turn on the multiple second light sources.

It should be noted that any combination of the components described above, any component of the present disclosure, or any manifestation thereof, may be mutually substituted between a method, apparatus, system, and so forth, which are also effective as an embodiment of the present disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OVERVIEW OF THE EMBODIMENTS

Figure 1A:
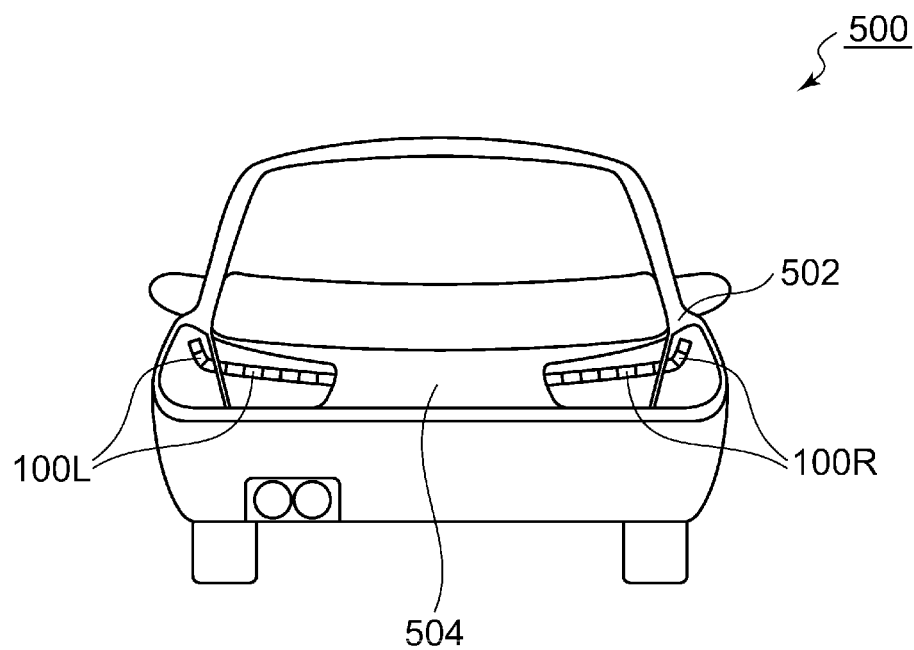
FIG. 1A is an external view of an automobile including a rear turn lamp.

An embodiment disclosed in the present specification relates to a rear turn lamp. The rear turn lamp has a divided structure including a first lamp unit provided to a fixed portion of a vehicle body and a second lamp unit provided to a movable portion of the vehicle body. The first lamp unit includes: a controller; one or multiple first light sources; and a first lighting circuit structured to turn on the one or multiple first light sources. The second lamp unit includes: multiple second light sources; and a second lighting circuit structured to turn on the multiple second light sources.

With this embodiment, the rear turn lamp includes a built-in controller. This arrangement is capable of supporting at least one from among an abnormal state detection function and various kinds of lighting control according to a situation of a vehicle, thereby providing improved commodity value.

Typically, a sequential turn lamp operates such that light sources are turned on from the inner side toward the outer side. Accordingly, it is natural to devise an arrangement in which a controller is mounted on the second lamp unit side including built-in light sources that are to be turned on in the first stage such that the second lamp unit functions as a master and the first lamp unit functions as a slave. However, such a movable portion of the vehicle, i.e., a trunk or rear hatch gate, is opened and closed frequently. With such an arrangement, in a case in which the controller is mounted on the movable portion side, the controller may be subjected to shock due to the opening or closing of the movable portion side, leading to the potential to degrade reliability. Furthermore, in many cases, such an arrangement has the potential to cause a load on the harness that couples the vehicle and the controller, leading to the potential to cause disconnection of the harness. In contrast, in a case in which the controller is mounted on the fixed portion side, this arrangement is capable of suppressing degradation of reliability. Furthermore, this arrangement lowers the potential to cause a load on the harness that couples the vehicle and the controller, thereby solving a problem of disconnection of wiring or the like. In a case in which both the first lamp unit and the second lamp unit are provided with a built-in controller, such an arrangement has a problem of an increased cost. In contrast, in a case in which only the first lamp unit side is provided with a controller, this arrangement suppresses an increase in costs.

Also, the first lamp unit and the second lamp unit may be coupled via a first line. Also, the controller may be structured to be capable of transmitting a first start signal to the second lighting circuit via the first line in response to a turn-on instruction from a vehicle. Also, in the first lighting mode, the second lighting circuit may turn on the multiple second light sources in a predetermined order in response to reception of the first start signal. Also, after the second lighting circuit has turned on the multiple second light sources in the first lighting mode, the first lighting circuit may turn on the one or multiple first light sources.

Also, the first lamp unit and the second lamp unit may be coupled via a second line. Also, after the multiple second light sources have been turned on, the second lighting circuit may be capable of transmitting a second start signal via the second line.

Also, the first lighting circuit may turn on the multiple first light sources in a predetermined order or at the same time in response to reception of the second start signal. In a case in which the second start signal is used as a flag that indicates that the multiple second light sources have been turned on, this arrangement allows the second lighting circuit to start its lighting-on operation without involving a controller.

Also, the controller may detect an abnormal state based on a period of time from transmission of the first start signal up to reception of the second start signal. In the normal operation, the controller receives the second start signal after a predetermined period of time elapses after the controller transmits the first start signal. In contrast, when an abnormal state has occurred in the first line or the second line or in the second lighting circuit, this lengthens the predetermined period of time from the reception of the first start signal up to the reception of the second start signal. That is to say, judgement may be made based on the two start signals regarding whether or not an abnormal state has occurred in any one from among the first line, the second line, and the second lighting circuit Also, when an abnormal state has been detected in at least one from among the multiple second light sources, the second lighting circuit may not transmit the second start signal. This lengthens the predetermined period of time required for the controller to receive the second start signal. This allows the controller to identify the occurrence of an abnormal state in the multiple second light sources.

Also, when an abnormal state has been detected in at least one from among the one or multiple first light sources, the first lighting circuit may notify the controller of the occurrence of an abnormal state. This allows the controller to identify an abnormal state that occurs in the first light sources.

The controller may monitor communication between the controller itself and the vehicle. Also, based on the monitoring results, the controller may judge whether or not an abnormal state has occurred. As an example, when a given periodic communication between the controller itself and the vehicle is interrupted, the controller may judge that an abnormal state has occurred. Also, as another example, the controller may judge whether or not an abnormal state has occurred based on consistency between a turn-on instruction transmitted from the vehicle and the information included in the periodic communication.

Also, the first lamp unit and the second lamp unit may be coupled via a third line. Also, the first lighting circuit and the second lighting circuit may be configured to be capable of switching between the first lighting mode and the second lighting mode. Also, the controller may select a lighting mode based on vehicle information received from the vehicle. Also, the controller may be capable of transmitting a mode signal that indicates the lighting mode to the second lighting circuit via the third line. Also, in the second lighting mode, the second lighting circuit may simultaneously turn on the multiple second light sources in response to reception of the first start signal. Also, in the second lighting mode, the first lighting circuit may simultaneously turn on the multiple first light sources at substantially the same time as the second lighting circuit turns on the multiple second light sources.

For example, when a trunk lid or a rear hatch gate is opened, or when a malfunction has occurred, the second lighting mode may be selected.

EMBODIMENTS

Description will be made below regarding the present disclosure based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present disclosure. Also, it is not necessarily essential for the present disclosure that all the features or a combination thereof be provided as described in the embodiments.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

First Example

FIG. 1A is an external view of an automobile 500 including rear turn lamps 100. The rear turn lamps 100L and 100R are mounted on a left-rear side and a right-rear side of the automobile 500. The automobile 500 includes a fixed portion 502 and a movable portion 504. The movable portion 504 may be configured as a trunk lid shown in FIG. 1A. Alternatively, in another example, the movable portion 504 may be configured as a rear hatch gate. The rear turn lamp 100 is provided as a combination of divided portions arranged on the fixed portion 502 side and the movable portion 504 side.

Figure 1B:
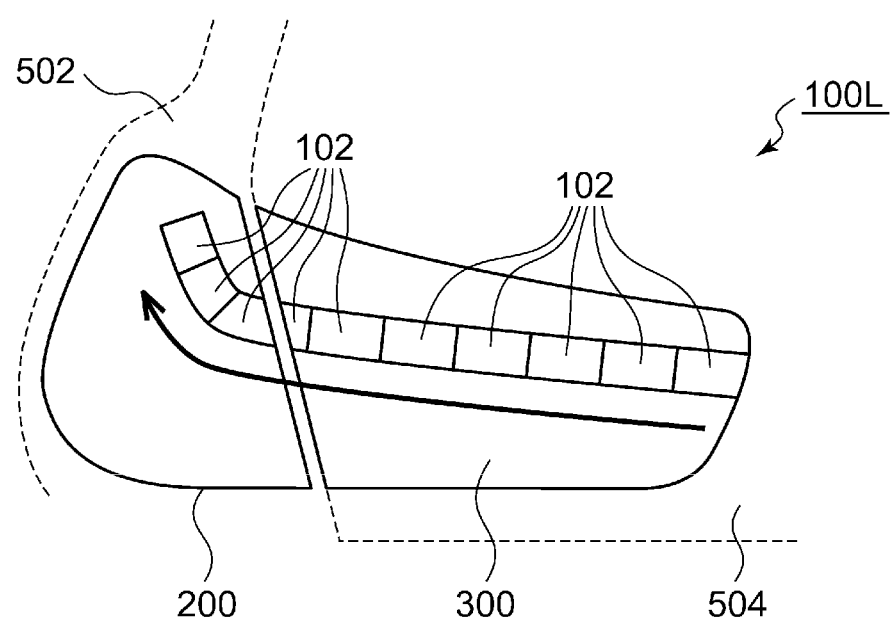
FIG. 1B is a diagram showing a left-side rear turn lamp.

FIG. 1B is a diagram showing the left-side rear turn lamp 100L. It should be noted that the rear turn lamp 10R has a structure that is left-right symmetrical to the rear turn lamp 100L.

The rear turn lamp 100L is configured of divided portions, i.e., a first lamp unit 200 and a second lamp unit 300. The first lamp unit 200 and the second lamp unit 300 include respective divided housings. The first lamp unit 200 is fixed on the fixed portion 502 side. The second lamp unit 300 is fixed on the movable portion 504 side such that it is arranged adjacent to the fixed portion 502. The first lamp unit 200 may be referred to as an "outer-side lamp unit", and the second lamp unit 300 may be referred to as an "inner-side lamp unit".

The first lamp unit 200 and the second lamp unit 300 are each configured such that multiple light sources 102 are arranged substantially horizontally. The rear turn lamp 100L is configured as a so-called sequential turn lamp. The rear turn lamp 100L is configured such that, when the vehicle turns left, the multiple light sources 102 are sequentially turned on from the inner side of the vehicle body (right side in the drawing) toward the outer side (left side in the drawing) in a direction indicated by the arrow. Typically, the light sources 102 are each configured as a light-emitting diode (LED). Also, other kinds of semiconductor light sources such as laser diodes (LD), organic Electro-Luminescence (EL) elements, or the like, may be employed.

Figure 2:
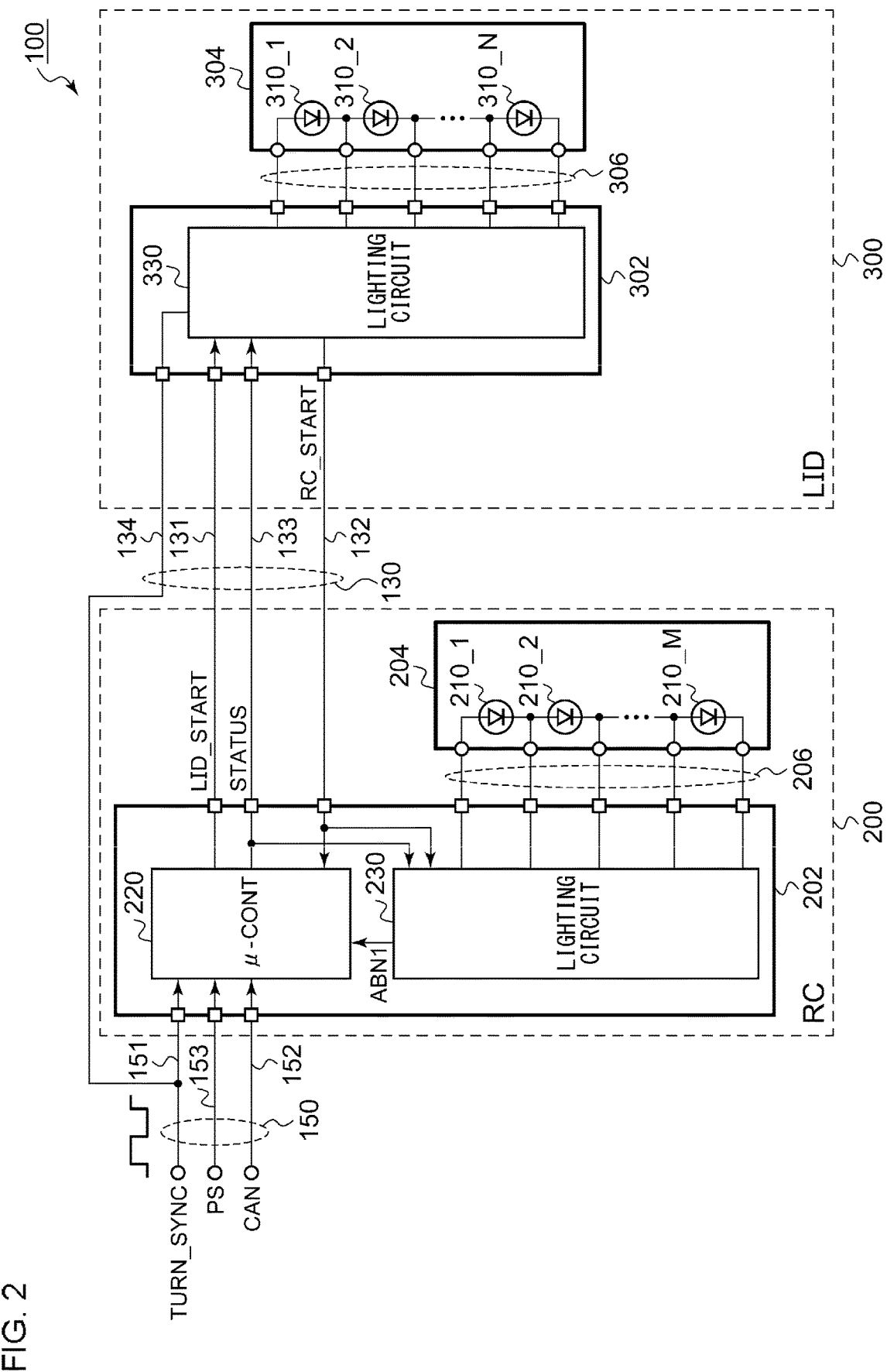
FIG. 2 is a block diagram showing the rear turn lamp.

FIG. 2 is a block diagram showing the rear turn lamp 100. The left and right rear turn lamps 100 have structures that are left-right symmetrical. However, the left and right rear turn lamps 100 may be configured to have the same function. Accordingly, the left and right rear turn lamps 100 can be represented as the same block configuration.

As described above, the rear turn lamp 100 has a divided configuration configured of the first lamp unit 200 and the second lamp unit 300.

The first lamp unit 200 is provided with multiple first light sources 210_1 through 210_M (M≥2), which correspond to the light sources on the first lamp unit 200 side from among the multiple light sources 102 shown in FIG. 1B. On the other hand, the second lamp unit 300 is provided with multiple second light sources 310_1 through 310_N (N≥2), which correspond to the light sources on the second lamp unit 300 side from among the multiple light sources 102 shown in FIG. 1B. A set of the multiple first light sources 210_1 through 210_M and a set of the multiple second light sources 310_1 through 310_N are each configured as a module. The module of the first light sources 210_1 through 210M will be referred to as a "first light source module 204". The module of the second light sources 310_1 through 310_N will be referred to as a "second light source module 304". The number of the first light sources 210, i.e., M, and the number of the second light sources 310, i.e., N, are not restricted in particular, and are designed giving consideration to the functions required for the rear turn lamp 100 and its design.

The first lamp unit 200 includes a controller 220 and a first lighting circuit 230 in addition to the first light source module 204. The controller 220 and the first lighting circuit 230 are mounted on the same first substrate 202, and are coupled via printed wiring. The multiple first light sources 210_1 through 210_M are provided such that they are in contact with an unshown heat sink instead of the first substrate 202. The first substrate 202 and the first light source module 204 are coupled via a harness 206.

The first lighting circuit 230 controls the on/off states of the multiple first light sources 210_1 through 210_M. More specifically, the multiple first light sources 210_1 through 210_M are turned on in a predetermined order sequentially from a timing at which the second light sources 310_1 through 310_N on the second light source unit 300 side have been turned on. The configuration of the first lighting circuit 230 is not restricted in particular. Rather, known devices or devices that will become available in the future may be employed.

The second lamp unit 300 includes a second lighting circuit 330 in addition to the second light source module 304. The second lighting circuit 330 is mounted on a second substrate 302. The second substrate 302 and the second light source module 304 are coupled via a harness 306. The second lighting circuit 330 controls the on/off states of the multiple second light sources 310_1 through 310_N. More specifically, the second lighting circuit 330 turns on the multiple first light sources 210_1 through 210_M in a predetermined order in response to a lighting-on instruction received from the controller 220. The controller 220 may be configured as a combination of a Central Processing Unit (CPU) and memory, or a microcontroller configured by integrating such components. Also, the controller 220 may be configured using hardware as a Field Programmable Gate Array (FPGA), or as an Application Specific Integrated Circuit (ASIC) including a digital circuit. The configuration of the second lighting circuit 330 is not restricted in particular. Rather, known devices or devices that will become available in the future may be employed.

The above is the basic configuration of the rear turn lamp 100.

With this embodiment in which the rear turn lamp 100 is provided with the controller 220, such an arrangement provides at least one from among the functions described later such as a function of detecting the occurrence of an abnormal state, a function of controlling various kinds of lighting on/off states according to a situation of the vehicle, and the like, thereby providing improved commodity value.

Furthermore, the movable portion 504 of the vehicle, i.e., the trunk or rear hatch gate, is opened and closed frequently. With such an arrangement, in a case in which the controller 220 is mounted on the movable portion 504, an impact is applied to the controller due to the opening or closing of the movable portion 504, leading to the potential to degrade reliability. Furthermore, in many cases, such an arrangement has the potential to cause a load on the harness that couples the vehicle and the controller 220, leading to the potential to cause disconnection of the harness. In contrast, in a case in which the controller 220 is mounted on the fixed portion 502 side, this arrangement is capable of suppressing degradation of reliability. Furthermore, this arrangement lowers the potential to cause a load on an in-vehicle harness 150 that couples the vehicle and the controller 220, thereby solving a problem of disconnection of wiring or the like.

Next, description will be made regarding a specific configuration and the features of the rear turn lamp 100.

The first lamp unit 200 and the second lamp unit 300 are coupled via a first line 131. The first line 131 is bundled together with other lines 132 through 134 described later, so as to form a lid harness 130. In response to a turn-on instruction from the vehicle, the controller 220 is capable of transmitting a first start signal (LID_START signal) to the second lighting circuit 330 via the first line 131.

A turn-on instruction is supplied from the vehicle as a turn synchronization (TURN_SYNC) signal via the power supply line 151 of the vehicle harness 150. The TURN_SYNC signal is a main power supply for the rear turn lamp 100, which is generated as a pulse signal that is set to a high level (i.e., battery voltage) in a lighting-on period (on period) of the rear turn lamp 100 and that is set to a low level (i.e., ground voltage) in a lighting-off period (off period). Typically, the turn lamp repeats blinking with a frequency of 1 to 2 Hz (60 to 120 times per second). For example, in a case of employing a blinking frequency of 1.5 Hz, the lighting on/off period is set to 666 ms. In this case, the TURN_SYNC signal has a first-half period of 333 ms in which it is set to the high level and a second-half period of 333 ms in which it is set to the low level.

The controller 220 is coupled to a vehicle-side Electronic Control Unit (ECU) via a Controller Area Network (CAN) bus or a Local Interconnect Network (LIN) bus. This allows the controller 220 to receive vehicle information, and to transmit information to the vehicle-side ECU. In order to allow the controller 220 to communicate with the vehicle-side ECU even in a period in which the TURN-SYNC signal is set to the low level, the controller 220 receives the supply of a power supply signal PS that differs from the TURN_SYNC signal via a line 153. The power supply signal PS may be configured as a normally on power supply such as a battery voltage or the like.

The second lighting circuit 330 instructs the multiple second light sources 310_1 through 310_N to turn on in a predetermined order with a predetermined time interval Δt (e.g., 16 ms) in response to reception of the LID_START signal. The lighting-on order is designed such that the second light sources 310_1 through 310_N are sequentially turned on in a direction from the inner side toward the outer side of the vehicle. It should be noted that FIG. 2 shows an example in which the multiple second light sources 310 are coupled in series, which are sequentially denoted by reference numerals "_#", i.e., "_1" through "_N", from the top.

However, the number "#" may be unrelated to the lighting-on order. Here, for ease of understanding and simplification of description, the second light sources 310 are sequentially turned on starting from the second light source 310_1 arranged on the higher electric potential side.

After the second lighting circuit 330 has turned on the multiple second light sources 310 in a first lighting mode, the first lighting circuit 230 sequentially turns on the multiple first light sources 210_1 through 210_M in a predetermined order with a predetermined time interval (16 ms). Similarly, the multiple first light sources 210 are denoted by numbers "#", i.e., "_1" through "_M", from the top. However, the numbers "#" may be unrelated to the lighting-on order. Here, for ease of understanding and simplification of description, the first light sources 210 are sequentially turned on starting from the first light source 210_1 arranged on the higher electric potential side.

The first lamp unit 200 and the second lamp unit 300 are further coupled via a second line 132. This allows the second lighting circuit 330 to transmit a second start signal (RC_START) via the second line 132 after the second lighting circuit 330 has turned on the multiple second light sources 310. Here, "RC" is an acronym for "Rear Combination". The first lamp unit 200 further includes a stop lamp and a rear lamp in addition to the turn lamp. That is to say, "RC" is named for its functions as a "rear combination lamp".

The RC_START signal is input to the first lighting circuit 230. The first lighting circuit 230 starts to turn on the multiple first light sources 210 in response to the reception of the RC_START signal. That is to say, the controller 220 is not required to control the timing at which the first lighting circuit 230 starts its lighting-on operation. This allows the load imposed on the controller 220 to be lightened.

Figure 3:
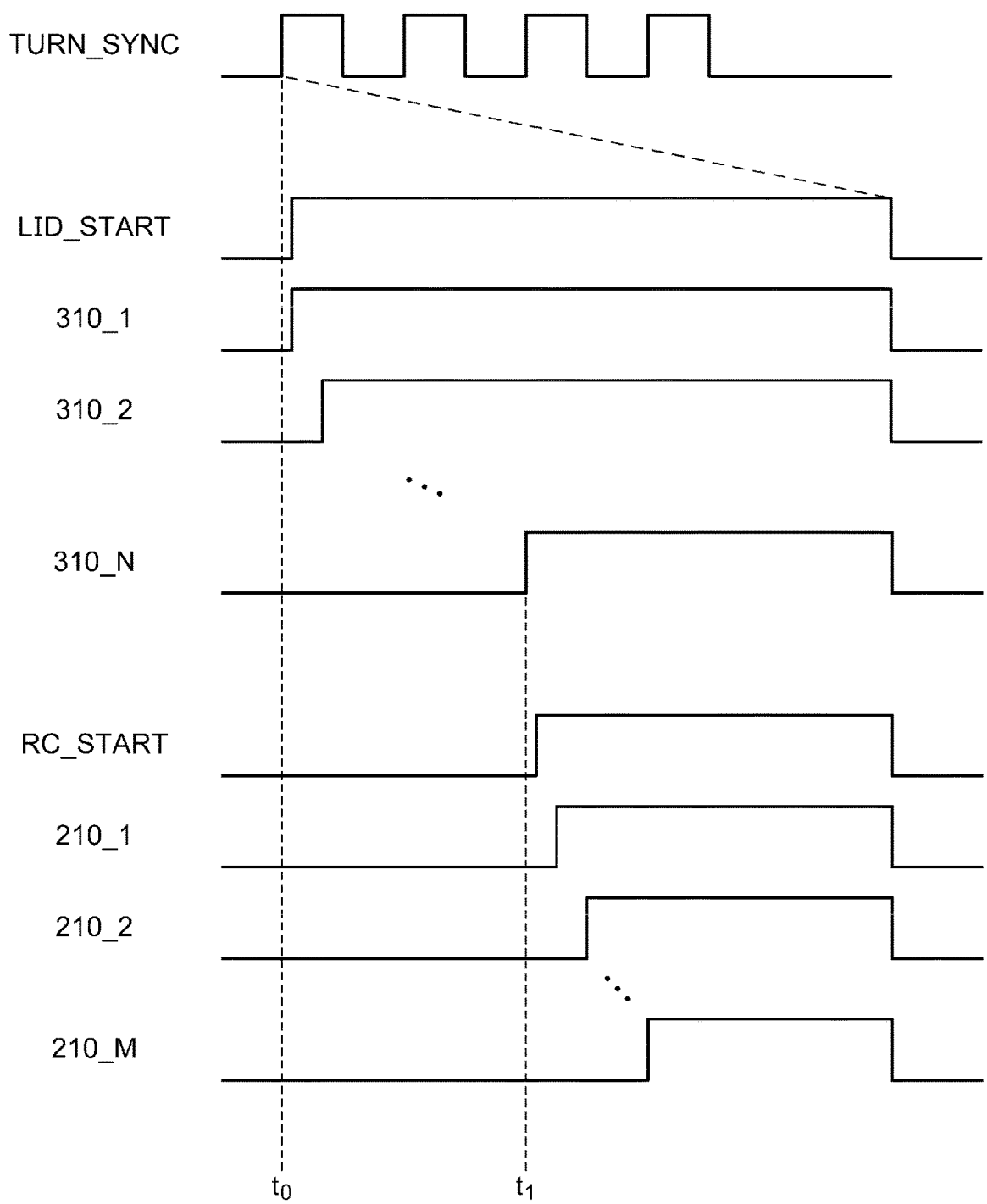
FIG. 3 is an operation waveform diagram showing the operation of the rear turn lamp shown in FIG. 2.

Furthermore, the TURN_SYNC signal is supplied to the second lamp unit 300 via a fourth line 134. The TURN_SYNC signal is a power supply voltage of the second lamp unit 300. Next, description will be made regarding the operation of the rear turn lamp 100. FIG. 3 is an operation waveform diagram showing the operation of the rear turn lamp 100 shown in FIG. 2.

The TURN_SYNC signal is repeatedly switched between the high level and the low level with a predetermined period. The TURN_SYNC signal is asserted (set to the high level) at the time point t0. The controller 220 asserts (sets to the high level) the LID_START signal within a predetermined period of time (e.g. 30 ms) after the assertion of the TURN_SYNC signal used as a trigger. The controller 220 transmits the LID_START signal thus asserted to the second lighting circuit 330. The second lighting circuit 330 sequentially turns on the multiple second light sources 310_1 through 310_N in response to the assertion of the LID_START signal. Subsequently, after all the second light sources 310 have been turned on at the time point t1, the second lighting circuit 330 asserts (sets to the high level) the RC_START signal, and transmits the RC_START signal thus asserted to the first lighting circuit 230. Subsequently, the first lighting circuit 230 sequentially turns on the first light sources 210_1 through 210_M. The above is the operation of the rear turn lamp 100.

Abnormal State Detection

Next, description will be made regarding an abnormal state detection operation of the rear turn lamp 100. 1.

1. Abnormal State of the Lid Harness 130

The RC_START signal is not only input to the first lighting circuit 230, but also to the controller 220. The controller 220 detects the occurrence of an abnormal state based on a period of time from the transmission of the LID_START signal up to the reception of the RC_START signal.

Description will be made regarding an example in which N=8. When the first line 131, the second line 132, and the second lighting circuit 330 are in the normal state, all the N (=8) second light sources 310 have been turned on after $\Delta t \times N = 16$ ms$\times 8 = 128$ ms elapses. In this stage, the controller 220 receives the RC_START signal. Accordingly, a threshold time $\tau$ is designed to be longer than $\Delta t \times N$ (e.g., 230 ms). Such an arrangement allows judgment to be made that an abnormal state of the lid harness 130 has occurred when the RC_START signal is not received after the threshold time $\tau$ elapses.

2. Abnormal State of the LED Harness 306

The second lighting circuit 330 has an open circuit detection function or a short circuit detection function for each of the multiple second light sources 310_1 through 310_N. When an abnormal state has been detected in any one of the second light sources 310, the second lighting circuit 330 does not assert the LID_START signal even after the last second light source 310N has been turned on. As a result, the controller 220 is not able to receive the RC_START signal within the threshold time $\tau$ after the LID_START signal is asserted. Accordingly, the controller 220 is capable of detecting the occurrence of an abnormal state in the LED harness 306 in addition to the occurrence of an abnormal state in the lid harness 130.

3. Abnormal State of the LED Harness 206

The first lighting circuit 230 has an open circuit detection function or a short circuit detection function for each of the multiple first light sources 210_1 through 210_M. When an abnormal state has been detected in any one of the first light sources 210, the first lighting circuit 230 transmits an abnormal state detection signal ABN1 to the controller 220. This allows the controller 220 to detect the occurrence of an abnormal state in the LED harness 206.

4. Notification of Abnormal State

The controller 220 is coupled to the in-vehicle ECU via a bus 152 configured as CAN, LIN, or the like, which allows them to communicate with each other. Upon detecting the occurrence of an abnormal state, the controller 220 notifies the in-vehicle ECU of the occurrence of an abnormal state. In addition, the controller 220 is capable of notifying the in-vehicle ECU of the kind of the abnormal state from among the abnormal states 1 through 3 described above.

Also, in a case in which the first lamp unit 200 includes nonvolatile memory configured as a built-in component, the controller 220 may record a log with respect to the detected abnormal state in the nonvolatile memory.

Mode Control

The rear turn lamp 100 supports a second lighting mode (normal lighting mode) in addition to the sequential lighting mode (first lighting mode) described above. The rear turn lamp 100 may be configured to be switchable between the two modes.

The controller 220 selects the lighting mode based on the vehicle information received from the in-vehicle ECU via the CAN (or LIN) bus 152. The in-vehicle ECU transmits the vehicle information including the following data C1 through C3 within a predetermined period of time (e.g., 20 ms) after the assertion (on state) of the TURN_SYNC signal. The vehicle information includes: (i) data C1 that indicates the lighting state; (ii) data C2 that indicates the presence or absence of a malfunction of a front turn lamp; and (iii) data C3 that indicates the open/closed state of the movable portion 504 (trunk lid).

The data C1 indicates the lighting state from among "turn", "hazard", and "Emergency Stop Signal (ESS)". When "turn" or "hazard" is indicated, the controller 220 selects the sequential lighting mode (first lighting mode). When "ESS" is indicated, the controller 220 selects the normal lighting mode (second lighting mode).

Furthermore, when the data C2 indicates the occurrence of an abnormal state in the front turn lamp or the data C3 indicates the open state of the movable portion 504, the controller 220 forcibly selects the normal lighting mode (second lighting mode) regardless of the state of the data C1. It should be noted that, when "ESS" is selected, the in-vehicle ECU sets the frequency of the TURN_SYNC signal to be higher than that set for "turn" or "hazard".

Next, detailed description will be made regarding the normal lighting mode.

After the lighting mode is selected based on the vehicle information, the controller 220 transmits a STATUS signal that indicates the lighting mode to the second lighting circuit 330 via the third line 133. Upon receiving the LID_START signal in a state in which the normal lighting mode is indicated, the second lighting circuit 330 immediately turns on the multiple second light sources 310 at substantially the same time.

The controller 220 also supplies the STATUS signal to the first lighting circuit 230. In the normal lighting mode, the first lighting circuit 230 simultaneously turns on the multiple first light sources 210 at substantially the same time at which the second lighting circuit 330 turns on the multiple second light sources 310.

Preferably, upon receiving the LID_START signal in the normal lighting mode, the second lighting circuit 330 immediately asserts the RC_START signal and transmits the RC_START signal thus asserted to the first lighting circuit 230. This allows the lighting-on timing at which the first lighting circuit 230 operates and the lighting-on timing at which the second lighting circuit 330 operates to be substantially the same.

Figure 4:
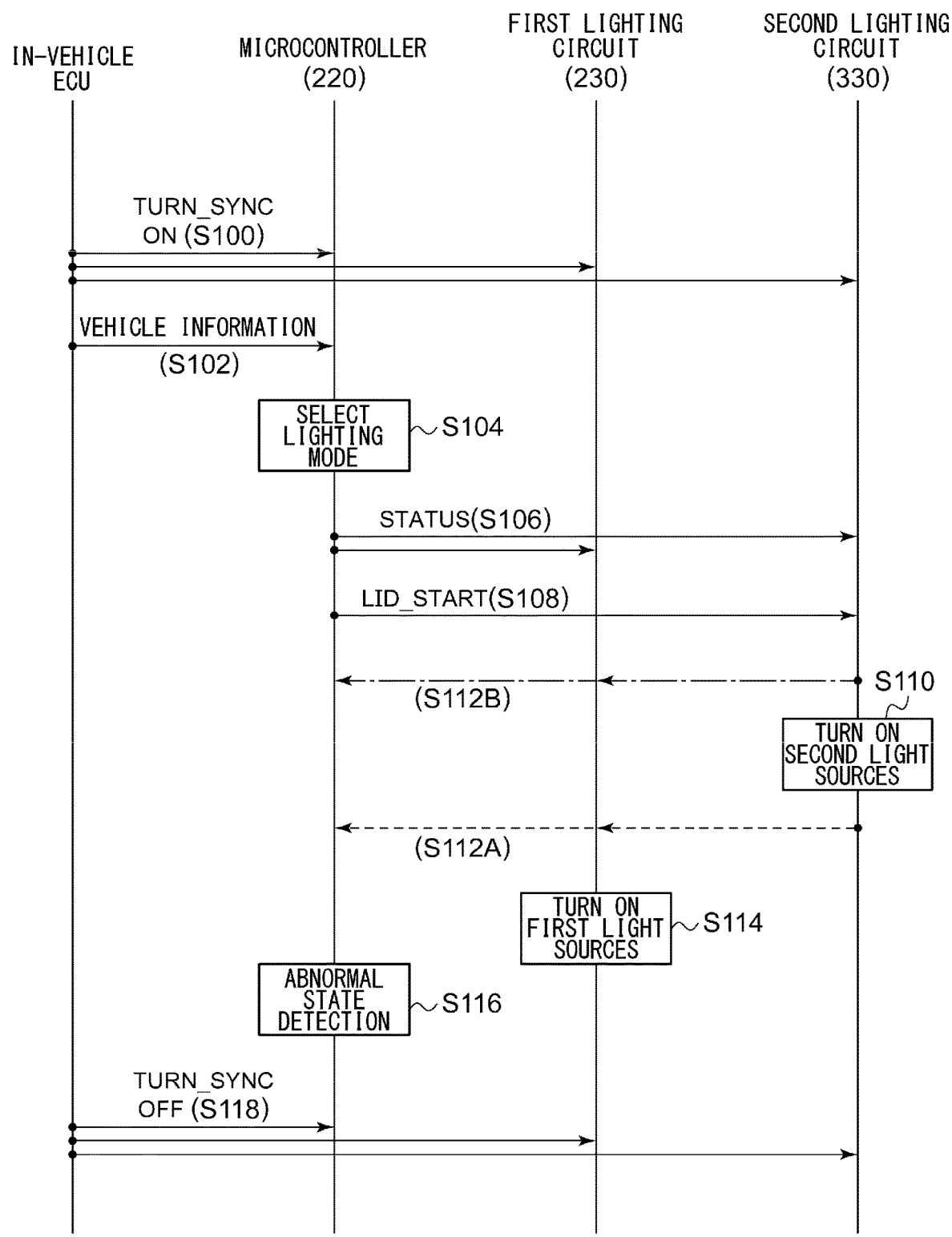
FIG. 4 is a sequence diagram showing the rear turn lamp.

FIG. 4 is a sequence diagram showing the operation of the rear turn lamp 100. The TURN_SYNC signal set to the on level is input to the controller 220, the first lighting circuit 230, and the second lighting circuit 330 (S100). Subsequently, the in-vehicle ECU transmits the vehicle information to the controller 220 (S102). The controller 220 selects the lighting mode based on the vehicle information (S104).

The controller 220 transmits the STATUS signal that indicates the mode to the first lighting circuit 230 and the second lighting circuit 330 (S106). Subsequently, the controller 220 transmits the LID_START signal to the second lighting circuit 330 (S108). Upon receiving the LID_START signal, the second lighting circuit 330 turns on the multiple second light sources 310 according to the lighting mode thus selected (S110). In a case in which the sequential lighting mode is selected, after the second light sources 310 have been turned on, the second lighting circuit 330 transmits the RC_START signal (S112A). In a case in which the normal lighting mode is selected, after the LID_START signal is received, the second lighting circuit 330 immediately transmits the RC_START signal (S112B). Upon receiving the LID_START signal, the first lighting circuit 230 turns on the multiple first lighting sources 210 according to the lighting mode thus selected (S114). The controller 220 judges the presence or absence of an abnormal state based on the time that has elapsed from the transmission of the LID_START signal up to the reception of the RC_START signal (S116). Subsequently, after the TURN_SYNC signal is set to the off state (S118), the power supply to the first lighting circuit 230 and the second lighting circuit 330 is cut off, thereby turning off the multiple first light sources 210 and the second light sources 310.

Circuit Configuration

Figure 5:
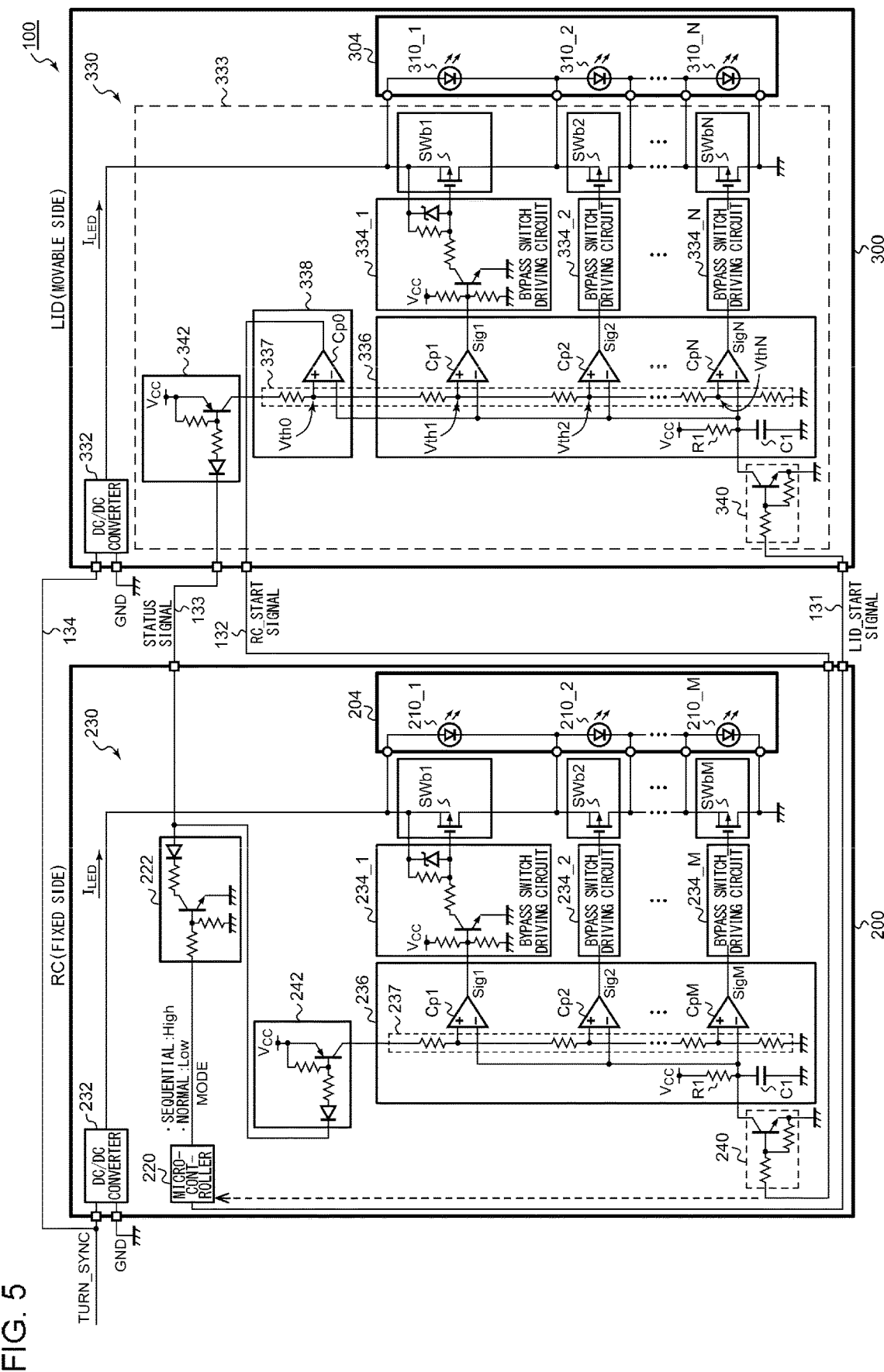
FIG. 5 is a circuit diagram showing the rear turn lamp.

FIG. 5 is a circuit diagram showing the rear turn lamp 100. First, description will be made regarding the configuration of the rear turn lamp 100 on the second lamp unit 300 side. In this example, the LID_START signal and the RC_START signal are designed employing a negative logic system. That is to say, when the light sources are to be turned on, the LID_START signal and the RC_START signal are each set to the low level.

The second lamp unit 300 includes the second light source module 304 and the second lighting circuit 330. The second lighting circuit 330 mainly includes a DC/DC converter 332 and a sequential circuit 333.

The DC/DC converter 332 is configured as a constant-current output converter. The DC/DC converter 332 supplies a constant driving current ILED to the second light source module 304.

The sequential circuit 333 includes multiple bypass switches SWb1 through SWbN. The multiple bypass switches SWb1 through SWbN are each configured as a P-channel MOS transistor, and are respectively coupled in parallel with the second light sources 310_1 through 310_N. When the i-th bypass switch SWbi is turned off, the driving current ILED flows through the second light source 310_i, thereby turning on the second light source 310_i. Conversely, when the i-th bypass switch SWbi is turned on, the driving current ILED flows through the bypass switch SWbi side, thereby turning off the second light source 310_i.

When the STATUS signal indicates the sequential mode (low level), the sequential circuit 333 sequentially turns on the multiple second light sources 310_1 through 310_N in a predetermined order with the assertion (low level) of the LID_START signal as a trigger. In this example, the second light sources 310 are turned on from the lower electric potential side up to the higher electric potential side, i.e., in the order of 310_N, 310_N−1, . . . , 310_2, and 310_1. Immediately after the last second light source 310_1 has been turned on, the sequential circuit 333 asserts (set to the low level) the RC_START signal.

The sequential circuit 333 further includes multiple bypass switch driving circuits 334_1 through 334_N, timer circuits 336 and 338, a reset switch 340, and a mode switching circuit 342.

Based on the output of the timer circuit 336, the bypass switch driving circuits 334_1 through 334_M control the corresponding bypass switches SWb1 through SWbN, respectively. Each bypass switch driving circuit 334_# ("#"=1, 2, . . . , N) has a function as an inverter and a function as a level shifter. When a control input Sig # is set to the low level, the bypass switch driving circuit 334_# inputs a high-level signal to the gate of the corresponding bypass switch SWb # so as to set the bypass switch SWb # to the off state, thereby turning on the second light source 310_#. Conversely, when the control input Sig # is set to the high level, the bypass switch driving circuit 334 # inputs a low-level signal to the gate of the corresponding bypass switch SWb # so as to set the bypass switch SWb # to the on state, thereby turning off the second light source 310 #.

During a period in which the LID_START signal is negated, i.e., is set to the high level, the timer circuit 336 sets all the control signals Sig1 through SigN to the high level. In this stage, all the bypass switches SWb1 through SWbN are turned on, thereby setting all the second light sources 310 to the lighting-off state.

In the sequential mode, the timer circuits 336 and 338 start time measurement during a period in which the LID_START signal is asserted (set to the low level). After the LID_START signal is set to the low level, the control inputs SigN, SigN−1, . . . , Sig2, and Sig1 are switched from the high level to the low level in this order every time a predetermined time interval Δt elapses. As a result, the second light sources 310 are sequentially turned on from the second light source 310 arranged on the lower electric potential side.

The STATUS signal is input to the mode switching circuit 342. When the STATUS signal is set to the low level (sequential mode), the mode switching circuit 342 supplies the power supply voltage VCC to the timer circuits 336 and 338. When the STATUS signal is set to the high level (normal mode), the mode switching circuit 342 cuts off the power supply voltage VCC.

The timer circuits 336 and 338 include a capacitor C1, a resistor R1, multiple comparators CP0 through CPN, and a resistor voltage dividing circuit 337. In the sequential mode, the resistor voltage dividing circuit 337 divides the power supply voltage (strictly speaking, VCC-Vce) supplied by the mode switching circuit 342, so as to generate multiple threshold voltages Vth0 through VthN. A given comparator Cp # from among the comparators Cp0 through CpN compares the voltage VC1 across the capacitor C1 with the corresponding threshold voltage Vth #. When VC1>Vth # holds true, the comparator Cp # outputs a signal Sig # set to the low level. Conversely, when VC1<Vth # holds true, the comparator Cp # outputs the signal Sig # set to the high level.

When the LID_START signal is negated (high level), the reset switch 340 is turned on, thereby lowering the voltage VC1 to the ground voltage, i.e., 0 V. In this state, the relation VC1<Vth0 through VthN holds true. Accordingly, all the control inputs Sig1 through SigN are set to the high level.

When the LID_START signal is asserted (low level), the reset switch 340 is turned off. In this state, the capacitor C1 is charged via the resistor R1, thereby raising the capacitor voltage VC1 with time. As a result, the outputs of the low-side comparators CpN, CpN−1, . . . , Cp1 are sequentially switched to the low level in this order. Lastly, the output of the comparator Cp0, i.e., the RC_START signal, is set to the low level (asserted). The RC_START signal is supplied to the first lamp unit 200.

When the STATUS signal is set to the high level (normal mode), the mode switching circuit 342 cuts off the power supply voltage VCC. As a result, all the threshold voltages Vth0 through VthN are set to the vicinity of the ground voltage, i.e., 0 V. In this state, when the LID_START signal is asserted (low level) so as to slightly raise the capacitor voltage VC1 from 0 V, the relation VC1>Vth1 through VthN holds true. In this state, the control signals Sig1 through SigN are immediately switched to the low level, thereby turning on the second light sources 310_1 through 310_N at the same time. In addition, at substantially the same time, the relation VC1>Vth0 holds true, and the RC_START signal is asserted (low level). The above is the configuration of the second lamp unit 300.

Next, description will be made regarding the first lamp unit 200. The first lamp unit 200 includes the first light source module 204, the controller 220, and the first lighting circuit 230.

The controller 220 generates a signal MODE that indicates the lighting mode. When the sequential mode is to be used, the MODE signal is set to the high level. When the normal mode is to be used, the MODE signal is set to the low level. The inverter 222 is configured as an open-collector circuit. The inverter 222 logically inverts the MODE signal, and outputs the MODE signal thus inverted to the second lamp unit 300 as the STATUS signal.

The first lighting circuit 230 mainly includes a DC/DC converter 232, multiple bypass switches SWb1 through SWbM, multiple bypass switch driving circuits 234_1 through 234_M, a timer circuit 236, and a mode switching circuit 242.

The DC/DC converter 232 is configured as a constant-current output converter. The DC/DC converter 232 supplies a constant driving current ILED to the first light source module 204. The multiple bypass switches SWb1 through SWbM are respectively coupled in parallel with the first light sources 210_1 through 210_M. When the i-th bypass switch SWbi is turned off, the driving current ILED flows through the first light source 210_i, thereby turning on the first light source 210_i. Conversely, when the i-th bypass switch SWbi is turned on, the driving current ILED flows through the bypass switch SWbi side, thereby turning off the first light source 210_i.

The bypass switch driving circuits 234_1 through 234_M control the corresponding bypass switches SWb1 through SWbM based on the outputs Sig1 through SigM of the timer circuit 236, respectively.

The STATUS signal is input to the mode switching circuit 242. The mode switching circuit 242 has the same configuration and supports the same operations as those of the mode switching circuit 342 provided on the second lamp unit 300 side.

The timer circuit 236 includes a capacitor C1, a resistor R1, and a resistor voltage dividing circuit 237, and has the same configuration as that of the timer circuit 336 provided on the second lamp unit 300 side. During a period in which the RC_START signal is negated (high level), the timer circuit 236 outputs the control signals Sig1 through SigM all of which are set to the high level. The bypass switch driving circuit 234_# controls the bypass switch SWb # according to the corresponding control signal Sig #.

In the sequential lighting mode, the timer circuit 236 sequentially switches the multiple control signals Sig1 through SigM to the low level in this order from the lower side, so as to turn on the first light sources 210 toward the upper side starting from the first light source 210_M provided as the lowest-side light source 210 in response to the assertion (low level) of the RC_START signal. In the normal lighting mode, the timer circuit 236 switches the multiple control signals Sig1 through SigM to the low level at the same time in response to the assertion (low level) of the RC_START signal.

In order to detect the occurrence of an abnormal state, the RC_START signal may be input to the controller 220. The above is the configuration of the first lamp unit 200.

Second Example

Description has been made in the first example regarding an arrangement in which, in the sequential lighting mode, the first lamp unit 200 turns on the multiple first light sources 210_1 through 210_M in a predetermined order. However, the present disclosure is not restricted to such an arrangement. In the second example, the first lighting circuit 230 simultaneously turns on the multiple first light sources 210_1 through 210_M in the sequential lighting mode in the same way as in the normal mode. In a case in which the multiple first light sources 210_1 through 210_M are substantially arranged in the vertical direction, in some cases, an arrangement in which the first light sources 210 are simultaneously turned on provides more natural lighting control.

As a modification of the second example, the number M of the first light sources 210 included in the first lamp unit 200 may be set to 1.

Description has been made above regarding the present disclosure with reference to the embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present disclosure. Description will be made below regarding such modifications.

First Modification

Description has been made regarding an arrangement in which the RC_START signal is employed as a trigger for starting to turn on the first lamp unit 200. However, the present disclosure is not restricted to such an arrangement. In a case in which the controller 220 is capable of using a built-in timer, the controller 220 may instruct an internal component of the first lamp unit 200 to generate the RC_START signal. In this case, the second line 132 may be omitted. Alternatively, such a modification may also employ the second line 132 such that the RC_START signal is returned to the first lamp unit 200. Such a modification may support abnormal state detection based on the time difference between the RC_START signal thus returned and the LID_START signal.

Second Modification

Description has been made in the embodiments regarding an arrangement in which the multiple first light sources 210 are coupled in series, and the on/off state is switched using a bypass control method. However, the present disclosure is not restricted to such an arrangement. For example, the multiple first light sources 210 may be coupled in parallel, and each first light source 210 may be coupled to a current source in series. Also, each current source may be switched on and off. The same can be same of the second light sources 310.

Third Modification

In FIG. 5, the timer circuit 236 or the timer circuit 336 may be configured as a digital timer (counter).

Fourth Modification

A part of or the entire configuration of the rear turn lamp 100 may be configured as a negative logic system or a positive logic system. Also, the high/low relation may be inverted for each signal or the configuration of a combinational circuit may be changed, which can be readily conceived by those skilled in this art. For example, in FIG. 5, the RC_START signal and the LID_START signal may be configured using a positive logic system. In this case, an inverter may be provided as an additional component, and provided as an upstream stage of each of the reset switches 240 and 340. Also, an inverter may be provided as an additional component for inverting the output of the timer circuit 338.

Fifth Modification

Description has been made regarding an arrangement in which, in the sequential lighting mode, the multiple second light sources 310_1 through 310_N are turned on in one-unit increments. However, the present disclosure is not restricted to such an arrangement. Also, the multiple second light sources 310_1 through 310N may be turned on in two-unit or three-unit increments.

Description has been made regarding the present disclosure with reference to the embodiments using specific terms. However, the above-described embodiments show only the mechanisms and applications of the present disclosure for exemplary purposes only, and are by no means intended to be interpreted restrictively. Rather, various modifications and various changes in the layout can be made without departing from the spirit and scope of the present disclosure defined in appended claims.

What is claimed is:

1. A rear turn lamp having a divided structure comprising:
   a first lamp unit provided to a fixed portion of a vehicle body;
   a second lamp unit provided to a movable portion of the vehicle body,
   wherein the first lamp unit includes,
      at least one first light source,
      a first lighting circuit structured to turn on the at least one first light source, and
      a controller which is a microcontroller separate from the first lighting circuit and structured to control the first lighting circuit based on a turn-on instruction from a vehicle,
   and wherein the second lamp unit includes,
      a plurality of second light sources, and
      a second lighting circuit structured to turn on the plurality of second light sources based on a signal supplied from the first lighting circuit, and wherein only the first lamp unit includes a microcontroller.

2. The rear turn lamp according to claim 1, wherein the first lamp unit and the second lamp unit are coupled via a first line,
   wherein the controller is configured to transmit a first start signal to the second lighting circuit via the first line in response to the turn-on instruction from the vehicle,
   wherein, in the first lighting mode, the second lighting circuit turns on the plurality of second light sources in a predetermined order in response to reception of the first start signal,
   and wherein, after the second lighting circuit has turned on the plurality of second light sources in the first lighting mode, the first lighting circuit turns on the at least one first light source.

3. The rear turn lamp according to claim 2, wherein the first lamp unit and the second lamp unit are coupled via a second line, and wherein, after the plurality of second light sources have been turned on, the second lighting circuit is configured to transmit a second start signal via the second line.

4. The rear turn lamp according to claim 3, wherein the first lighting circuit turns on the at least one first light source in a predetermined order or at the same time in response to reception of the second start signal.

5. The rear turn lamp according to claim 3, wherein the controller detects an abnormal state based on a period of time from transmission of the first start signal up to reception of the second start signal.

6. The rear turn lamp according to claim 5, wherein, when an abnormal state has been detected in at least one from among the plurality of second light sources, the second lighting circuit does not transmit the second start signal.

7. The rear turn lamp according to claim 1, wherein, when an abnormal state has been detected in at least one from among the at least one first light source, the first lighting circuit notifies the controller of the occurrence of an abnormal state.

8. The rear turn lamp according to claim 2, wherein the first lamp unit and the second lamp unit are coupled via a third line,
wherein the first lighting circuit and the second lighting circuit are configured to switch between the first lighting mode and the second lighting mode,
wherein the controller selects a lighting mode based on vehicle information received from the vehicle,
wherein the controller is capable of transmitting a mode signal that indicates the lighting mode to the second lighting circuit via the third line,
wherein, in the second lighting mode, the second lighting circuit simultaneously turns on the plurality of second light sources in response to reception of the first start signal,
and wherein, in the second lighting mode, the first lighting circuit simultaneously turns on the at least one first light source at substantially the same time as the second lighting circuit turns on the plurality of second light sources.

* * * * *